Figure 1:
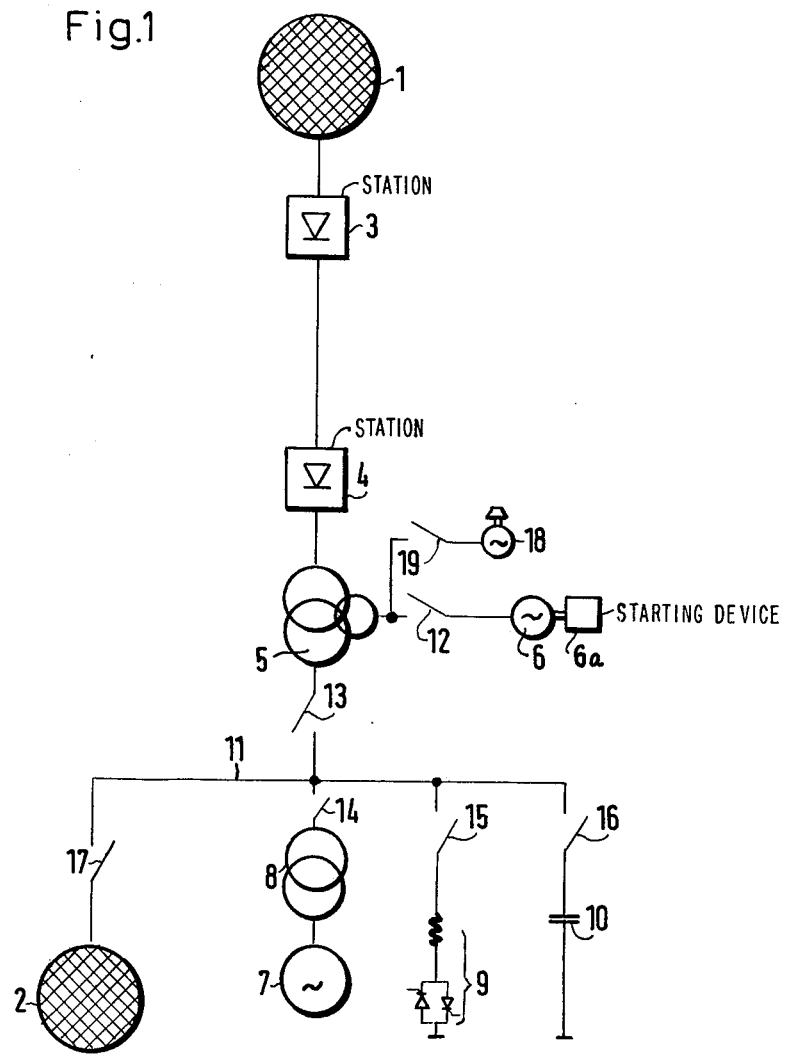

United States Patent [19]

Häusler

[11] 4,133,026
[45] Jan. 2, 1979

[54] METHOD OF STARTING UP A HIGH-VOLTAGE D-C INVERTER OR TRANSMISSION STATION IN ISOLATED OR ISLAND OPERATION

[75] Inventor: Michael Häusler, Hirschberg, Germany

[73] Assignee: BBC, Aktiengesellschaft Brown, Boveri & Cie, Baden, Switzerland

[21] Appl. No.: 768,497

[22] Filed: Feb. 14, 1977

[30] Foreign Application Priority Data

Feb. 13, 1976 [DE] Fed. Rep. of Germany ....... 2605793

[51] Int. Cl.² .............................................. H02J 3/36
[52] U.S. Cl. .................................................... 363/49
[58] Field of Search ................. 307/64, 68, 85; 363/49

[56] References Cited

U.S. PATENT DOCUMENTS

| 2,208,182 | 7/1940 | Elder | 363/49 X |
| 2,961,595 | 11/1960 | Chumakov | 363/49 X |
| 3,934,155 | 1/1976 | Galitsyn | 307/64 X |

Primary Examiner—A. D. Pellinen
Attorney, Agent, or Firm—Herbert L. Lerner

[57] ABSTRACT

Method of starting up a station of a high-voltage d-c transmission system having at least two converters which with current and voltage regulators are connectible to d-c and three-phase networks or power plants and are selectively operable as rectifiers and inverters, and for starting up the three-phase network or power plant connected to the station, the station at the start-up time, being isolated from a functioning three-phase network or power plant and auxiliary equipment required for the operation thereof, which includes feeding from the d-c side of the high-voltage d-c transmission system active power required for starting up the station of the high-voltage d-c transmission system, and feeding from an independent reactive-power source reactive commutation power required for the start-up operation of the station of the high-voltage d-c transmission system as well as other reactive power required during the start up.

10 Claims, 3 Drawing Figures

METHOD OF STARTING UP A HIGH-VOLTAGE D-C INVERTER OR TRANSMISSION STATION IN ISOLATED OR ISLAND OPERATION

The invention relates to a method of starting up a station of a high-voltage d-c inverter or transmission system formed of at least two converters with current and voltage regulators, which are connectible to d-c and three-phase a-c networks or power plants and are selectively operable as rectifiers or inverters and for starting up or setting into operation a three-phase a-c network or power plant connected with the station.

The invention can find application with the installation of the high-voltage d-c transmission system to feed areas of concentration or congestion. This anticipated application can lead as a consequence thereof, to a situation wherein island or isolated networks with predominantly or even exclusively passive load are fed through inverters of a high-voltage d-c transmission system (IEEE Transactions on Power Apparatus and Systems, Vol. Pas-94, No. 2, March/April 1975, pages 408 to 415 = corresponding special issue of the HVDC publication series). While this operation in itself presents no basic problems, no solution is known to date for the restarting which is required after network disruptions.

A method for starting up an HVDC inverter or transmission installation of the aforementioned type has become known, but only such a method, however, which makes the assumption that, at the instant of start-up, the three-phase a-c networks are connected and intact (German Patent DT-PS 1 613 574).

The heretofore known method therefore solves only some of the problems which occur in starting-up as opposed to normal operation. It should be noted, in particular, that in the build-up of the line current, the gapping limit of the converters must be traversed i.e. the d-c current which flows in the d-c line, has gaps therein and is therefore not steady or continuous. In the aforementioned heretofore known method, the difficulties connected therewith with respect to the control devices are solved by the provision that an even number of converter bridges is controlled in such a manner that, initially, in each converter station, one-half of the converter bridges is driven in rectifier operation and the other half in inverter operation with the smallest permissible control angles. Thereafter, the current regulator of the rectifier station at first sets the desired current and, after the desired current is reached, the voltage regulator of the inverter station runs the voltage up to the nominal value, which is accomplished by switching the respectively oppositely controlled converter bridges into the intended mode of operation. The reactive power demand that is required is covered or supplied predominantly from the three-phase a-c network.

It is accordingly an object of the invention to provide a method of starting up an high-voltage d-c inverter or transmission station and the three-phase a-c network or power plant connected therewith even in the absence of a functioning three-phase a-c network or power plant. Such a case is conceivable if a network is fed predominantly or exclusively by an HVDC transmission installation (island or isolated network) and the network operation temporarily fails due to a disturbance or disruption, for example, in the station of the HVDC transmission installation or in the supplied network.

A similar situation is presented when a first block of a power plant or station with an HVDC transmission system-block circuit is started up, if this power station is isolated from an external three-phase network (e.g., as an off-shore power plant or station).

The statement of this problem is per se an indication of inventive thought because the state of the art as presently practiced requires the establishment of a functioning three-phase a-c network for restarting an isolated station of an HVDC transmission system. This restarting can be accomplished in a generally conventional manner by initially supplying the internally required power of the block by means of diesel generators and then starting up the main generators. Only then is the HVDC transmission system connected up.

In thermal power plants or stations, gas turbines with about 6% of the power of the main generators would be required to practice this heretoforeknown method. This solution is too costly, is non-economical in operation and reduces the competitiveness of high-voltage d-c transmission system relative to high-voltage three-phase a-c transmission systems. The latter can obtain the required starting power without difficulty through the connection of the high-voltage three-phase transmission system.

With the foregoing and other objects in view, there is provided, in accordance with the invention, a method of starting up a station of a high-voltage d-c transmission system having at least two converters which, with current and voltage regulators, are connectible to d-c and three-phase networks or power plants and are selectively operable as rectifiers and inverters, and for starting up the three-phase network or power plant connected to the station, the station at the start-up time, being isolated from a functioning three-phase network or power plant and auxiliary equipment required for the operation thereof, which comprises feeding from the d-c side of the high-voltage d-c transmission system active power required for starting up the station of the high-voltage d-c transmission system, and feeding from an independent reactive power source reactive commutation power required for the start-up operation of the station of the high-voltage d-c transmission system as well as other reactive power required during the start-up.

This surprisingly simple and relatively inexpensive solution of the aforementioned problem was not shown heretofore, because the high-voltage d-c transmission systems according to the state of the art, having line-commutated converters, relies on the presence of an a-c voltage or the availability of reactive commutation power.

These difficulties are circumvented by the measures according to the method invention without having to employ expensive starting generators. To start up the station of the high-voltage d-c transmission system and the auxiliary equipment depending thereon, a reactive power source, such as a phase shifter machine, for example, is brought up to the voltage and the frequency of the operational values of the station at the beginning of the starting operation. The phase shifting machine, together with an independent energy source intended for covering the idling losses, is connected, in accordance with the invention, to the open-circuited converter transformer of the station. After the operation values are reached, the firing pulses for the controlled valves of the converter of the station are released. Active power can then be obtained through the HVDC transmission system and, thus, the auxiliary equipment required for the start-up, for example, of the power plant or station and the station of the HVDC transmission system can be supplied.

The foregoing method invention has the advantage that, for starting up a reactive power source and an idling converter installation, only very little active power is required. Moreover, the reactive power source can be used also during normal operation. This is not of particular advantage in the case of the power station-block circuit, since, in such a case, the required power can normally be covered or supplied by the main generator; reactive-power sources are required in every case if an island or isolated network is supplied by means of the high-voltage d-c transmission system, so that the method according to the invention requires, except for the cost for activating the reactive-power source, no appreciably greater expenditure than for normal operation.

In accordance with another mode of the invention, wherein the station is supplied by a power plant, the method comprises selectively switching the start-up reactive-power source through switching devices to different power-plant blocks for feeding reactive commutation power thereto.

In accordance with a further mode of the invention, wherein the station is supplied by a power plant, the method comprises, in an initial phase of the start up, feeding the reactive commutation power from synchronous motors in the station-service network of the power station.

In accordance with an additional mode of the invention, wherein the station is supplied by a power plant, the method comprises feeding active power from a station-service network supplied by the high-voltage d-c transmission system to a block generator of the block circuit, and synchronizing and connecting the block generator with the converter associated with the high-voltage d-c transmission system.

In accordance with an added mode of the invention, the method comprises adjusting the d-c voltage of the high-voltage d-c transmission system initially to zero and d-c current to values slightly above gapping limit so as to avoid increased voltage stresses with the least possible amount of reactive converter power and, upon increase of the transmitted power, initially increasing the voltage and, upon reaching an upper voltage limit, increasing the d-c current.

In accordance with yet another mode of the invention, wherein a station of a high-voltage d-c transmission system with constant d-c voltage is started up, the method comprises initially connecting two groups of converters of the station in antiparallel arrangement for full pole voltage, and operating the two groups of converters as respective rectifiers and inverters with minimal current above gapping limit.

In accordance with yet a further mode of the invention, the method comprises increasing the d-c voltage to nominal d-c voltage by minimizing the control angles during operation of the converters with minimal current, thereafter effecting a single-pole connection to an high-voltage d-c transmission system-multipoint network by the station of the high-voltage d-c transmission system that is to be set in operation, and maintaining the inverter-rectifier operation of the antiparallel circuit until the d-c current from the high-voltage d-c transmission system network exceeds the gapping limit.

In accordance with a concomitant mode of the invention, the method comprises, after a converter group has attained minimal transmission power sufficient for the minimal current, disconnecting the other converter group and switching it over to normal operation.

Other features which are considered as characteristic for the invention are set forth in the appended claims.

Although the invention is illustrated and described herein as embodied in a method of starting up a high-voltage d-c inverter or transmission station in isolated or island operation, it is nevertheless not intended to be limited to the details shown, since various modifications may be made therein without departing from the spirit of the invention and within the scope and range of equivalents of the claims.

Figure 2:
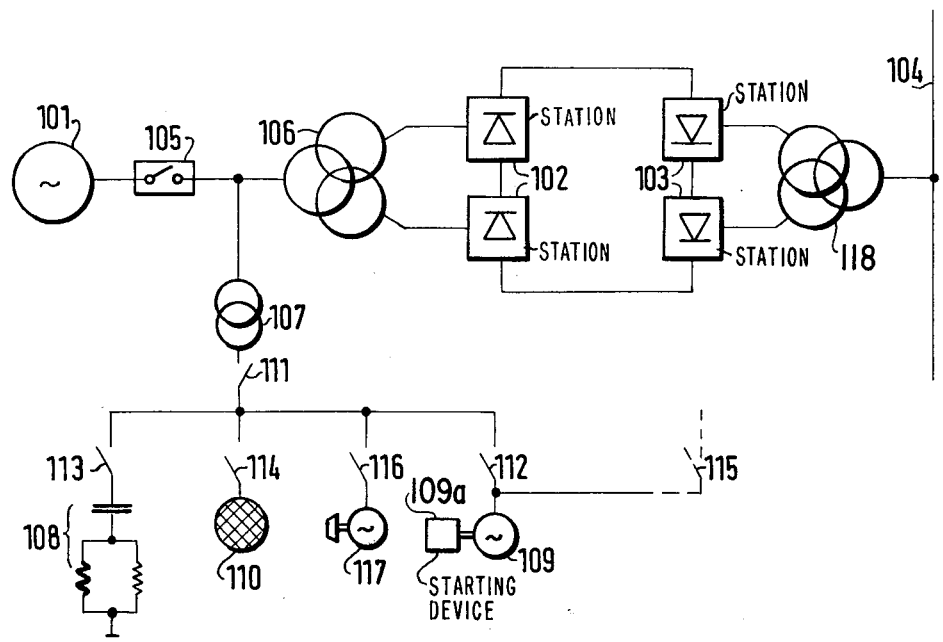
Figure 3:
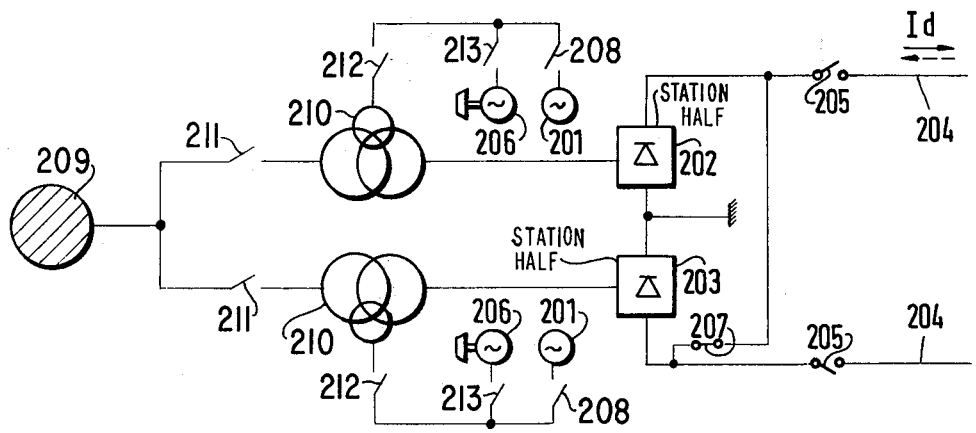

The invention, however, together with additional objects and advantages thereof will be best understood from the following description when read in connection with the accompany drawings, in which:

FIG. 1 is a circuit diagram of an isolated network predominantly fed by a high-voltage d-c transmission system during start-up operation, FIG. 2 is a circuit diagram of a power station with a high-voltage d-c transmission system block circuit and apparatus for the start-up operation; and FIG. 3 is a circuit diagram of an embodiment for start-up operation in the case of multi-point operation of a high-voltage d-c transmission system.

With respect to the figures, it is understood that the circuits shown represent the respective high-voltage d-c transmission systems and auxiliary equipment only schematically. Regarding the specific construction of a high-voltage d-c transmission system converter, reference may be made, for example, to the journal ETZ-A, Vo.. 89 (1968), no. 8 and no. 9.

Case 1: Starting-up an isolated network predominantly fed by a high-voltage d-c transmission system.

The circuit for this purpose is shown in FIG. 1. In normal operation, the active power consumed in the three-phase isolated or island network 2 is drawn from a three-phase network 1 through a high-voltage d-c transmission system which includes stations 3 and 4. The reactive power requirement of the isolated network 2 is supplied by a phase shifter 7 through a transformer 8 and/or a capacitor bank 10, optionally in cooperation with controllable chokes 9. The same reactive-power sources supply the reactive power required by the station 4 of the high-voltage d-c transmission system. For starting-up, a phase shifter 6 of relatively low power is additionally provided.

After a possibly complete failure of the voltage in the network 2, the reactive-power sources connected thereto are no longer available.

After the disturbance has been corrected, the start-up phase shifter 6 is run up to normal operating speed by means of an independent starting device 6a, the switch 12 being closed and the switch 13 open. As soon as the voltage and the frequency have attained the operational values thereof, theretofore blocked firing pulses of the converter 4 are released in the 90°-position. To cover the losses in the converter group that is to be set in operation, a diesel engine 18 (the emergency diesel set of the station) can be connected-up switch 19 in parallel with the start-up phase shifter 6 until energy is supplied from the high-frequency d-c transmission system connection, if the power of the starting device 6a of the phase shifter 6 is inadequate.

After the rectifiers of the station 4 are fired, the rectifiers of the station 3 are unblocked in 90°-operation and are so controlled that the d-c transmission voltage remains near zero and the transmission current is above the gapping limit. In this condition, active power can be supplied from the network 1 to the station 4.

The switches or circuit breakers 13 to 16 can then be closed; the reactive-power balance of the bus bar 11, inclusive of the start-up phase shifter 6, having to be compensated for.

The network 2 can be switched back through a switch 17 in stages to the bus bar 11, which is now under voltage. The respectively added active consumer power is to be provided or covered by the high-voltage d-c transmission system, which can be accomplished through control of the converters. The characteristic curve for the control can be shaped in a manner that, with increasing active power, the current from the station 3 is controlled to the minimum value thereof, while the station 4 regulates the d-c voltage in such a manner that the desired acgive power is transmitted. As soon as the voltage reaches its top value, which is given, for example, by the smallest quenching angle, a change-over to quenching angle control can occur, while the station 3 then changes the transmission current in accordance with the demand transmission power. Simultaneously, the reactive power required by the network and the converter transformer 5 is increased in the reactive-power sources 7, 9 and 10.

Case 2: Starting-up a high-voltage d-c transmission station that is fed by power station with high-voltage d-c transmission system-block circuit.

The circuit for this purpose is shown in FIG. 2. In the normal condition, energy is transmitted from a power plant with a generator 101 into a three-phase network 104 through stations 102 and 103 of a high-voltage d-c transmission system (with respective converter transformers 106 and 118). The internal requirement of the block is drawn from the terminals of the generator 101 through a switch 111 and a power transformer 107 for the internal requirement of the block. Since the terminal voltage of the generator 101 is distorted due to the converter operation, a highpass filter 108 can be installed on the secondary side of the internal requirement-power transformer 107 for filtering the voltage and, through a switch 113, for also supplying part of the reactive fundamental power in the internal-requirement power network 110. The rest of the reactive power, particularly that required by the converter 102, is supplied by the generator 101.

For starting, the start-up phase shifter 109, with the aid of an independent starting device 109a is accelerated to operational speed, the switches 105 and 114 to 116 being open and the switch 112 closed. When the voltage and the frequency have reached the operational values, an emergency diesel set 117, if necessary, is added or switched on. The purpose for the diesel set 117 is to cover the station losses until energy can be drawn through the high-voltage d-c transmission system.

Through the release of the firing pulses, the stations are set in operation and, more specifically, station 102 is set in 90°-operation and thereafter station 103 with a drive or control near 90°; the transmission operating initially with zero d-c voltage and minimal non-gapping d-c current. Then, the switch 113 is closed and the phase shifter 109 is so controlled that the reactive-power balance is compensated.

Thereafter, the internal-requirement network 110 is connected up or switched on in stages through the switch 114, the phase shifter 109 being further controlled so that the reactive-power balance is adjusted or equalized. In case the internal-requirement network 110 of the power plant has synchronous motors, it can be switched on in the start-up phase whereby the synchronous motors of the internal-requirement network 110 can then contribute to the delivery of reactive power. The active power demanded by the internal requirement must be covered or supplied by the high-voltage d-c transmission system. As soon as the entire internal requirement of the block is supplied, the generator 101 can be started up, synchronized and connected through the generator switch 105. From this instant on, the generator 101 can assume the coverage or supply of the internal demand or requirement and of the reactive power of the converter 102.

To establish the normal energy flow direction, the polarity of the d-c voltage must then be reversed by shifting the firing pulses. The station 102 is thereby driven into rectifier operation, and the station 103 into inverter operation.

After the normal state is reached, the phase shifter 109 can be disconnected by the switch 112.

Since several blocks are often provided in a power plant or station, the phase shifter 109 can be used to advantage also for starting up other blocks through additional switches 115.

In principle, a self-commutating reactive current converter or self-commutating converters in conjunction with controllable chokes and capacitors can also be employed instead of the phase shifter 109.

Case 3: Starting-up a station of a high-voltage d-c transmission system in a multi-point network.

The hereinafore described start-up procedure assumes that the d-c transmission voltage is initially held at zero or near zero. This limitation is objectionable in the case of multi-point operation (German Patent DT-PS 1 588 067).

In those cases wherein a reduction in the d-c transmission voltage is undesirable, the following approach can be taken (note FIG. 3 wherein a three-phase island network or power plant 209 and coresponding converter transformers 210 of respective switches 211 are shown):

First, reactive-power sources 201 are set in operation. To this end, they are connected through switch 208 and switch 212 to two station halves 202 and 203 (e.g. 6- or 12-pulse bridge circuits), which are connected antiparallel to one another through a switch 207, the one station half 202 being operated as a rectifier and the other 203 as an inverter. (For the sake of simplification, anti-parallel-connected 6-pulse units 202, 203 are shown schematically in FIG. 3). During the start-up operation in the phase wherein the converters of the station of the high-voltage d-c transmission system that is to be started up are already under voltage and the rectifiers or valves thereof are already fired, but wherein, however, the station of the high-voltage d-c transmission system does not yet obtain active power from the high-voltage d-c transmission system-network 204, the losses that occur must be covered additionally, for example, by an emergency diesel set 206 through the switch 213 of the power plant or station or the inverter station of the high-voltage d-c transmission system. The active power required is in the neighborhood of 0.1% of the transmission power of the high-voltage d-c transmission system and is therefore small in comparison to the total internal power requirement of a power plant or station.

If the converters are operated with minimal current above the gapping limit, the d-c voltage can be increased by decreasing the initially large control angle $\alpha$ (in group 202) or β (in group 203) to such an extent that the nominal d-c voltage is attained. Thereupon, the station of the high-voltage d-c transmission system to be in operation can be connected through a single pole to the multipoint network 204 of the high-voltage d-c transmission system by closing merely one switch 205. Active power can then be drawn from the network 204 or delivered thereto; the rectifier-inverter circuit operation being required to be maintained only until the d-c transmission current $I_d$ exceeds the gapping limit. The antiparallel circuit or connection has the advantage, moreover, that in the case of the block circuit of the high-voltage d-c transmission system, the transition to normal operation can take place while energy is supplied into the multipoint network 204, without having to reverse the polarity of the d-c voltage.

There are claimed:

1. Method of starting up a station of a high-voltage d-c transmission system having at least two converters which with current and voltage regulators are connectible to d-c and three-phase networks or power plants and are selectively operable as rectifiers and inverters, and for starting up the three-phase network or power plant connected to the station, the station at the start-up time, being isolated from a functioning three-phase network or power plant and auxiliary equipment required for the operation thereof, which comprises feeding from the d-c side of the high-voltage d-c transmission system active power required for starting up the station of the high-voltage d-c transmission system, and feeding from an independent reactive-power source reactive commutation power required for the start-up operation of the station of the high-voltage d-c transmission system as well as other reactive power required during the start-up.

2. Method according to claim 1 wherein the feeding of the reactive commutation power is from at least one of a phase shifter machine, a capacitor bank and a self-commutating reactive-current converter.

3. Method according to claim 1 wherein the feeding of the reactive commutation power is from a phase shifter machine and which includes, at the start-up operation of the station of the high-voltage d-c transmission system, bringing the phase shifter machine to the voltage and frequency of the operational values of the station, the phase shifter machine together with an independent energy source provided for covering losses of the converter being connected to a converter transformer of the station or the block circuit, and, after the phase shifter has attained the voltage and frequency, releasing firing pulses for controllable valves of the converter of the station.

4. Method according to claim 1 wherein the station is supplied by a power plant and which comprises selectively switching the start-up reactive-power source through switching devices to different power-plant blocks for feeding reactive commutation power thereto.

5. Method according to claim 1 wherein the station is supplied by a power plant and which comprises, in an initial phase of the start-up, the feeding of reactive commutation power being from synchronous motors in the station-service network of the power station.

6. Method according to claim 1 wherein the station is supplied by a power plant and which comprises feeding active power from a station-service network supplied by the high-voltage d-c transmission system to a block generator of the block circuit, and synchronizing and connecting the block generator with the converter associated with the high-voltage d-c transmission system.

7. Method according to claim 1 which comprises adjusting the d-c voltage of the high-voltage d-c transmission system initially to zero and the d-c current to values slightly above gapping limit so as to avoid increased voltage stresses with the least possible amount of reactive converter power and, upon increase of the transmitted power, initially increasing the voltage and, upon reaching an upper voltage limit, increasing the d-c current.

8. Method according to claim 1 wherein a station of a high-voltage d-c transmission system with constant d-c voltage is started up, which comprises initially connecting two groups of converters of the station in antiparallel arrangement for full pole voltage, and operating said two groups of converters as respective rectifiers and inverters with minimal current above gapping limit.

9. Method according to claim 8 which comprises increasing the d-c voltage to nominal d-c voltage by minimizing the control angles during operation of the converters with minimal current, thereafter effecting a single-pole connection to an high-voltage d-c transmission system-multipoint network by the station of the high-voltage d-c transmission system that is to be set in operation, and maintaining the inverter-rectifier operation of the antiparallel circuit until the d-c current from the high-voltage d-c transmission system network exceeds the gapping limit.

10. Method according to claim 8 which comprises, after a converter group has attained minimal transmission power sufficient for the minimal current, disconnecting the other converter group and switching it over to normal operation.

* * * * *